Oct. 9, 1928.
E. I. McKESSON
1,687,255
GAS ADMINISTERING APPARATUS
Filed Sept. 12, 1921    3 Sheets-Sheet 2
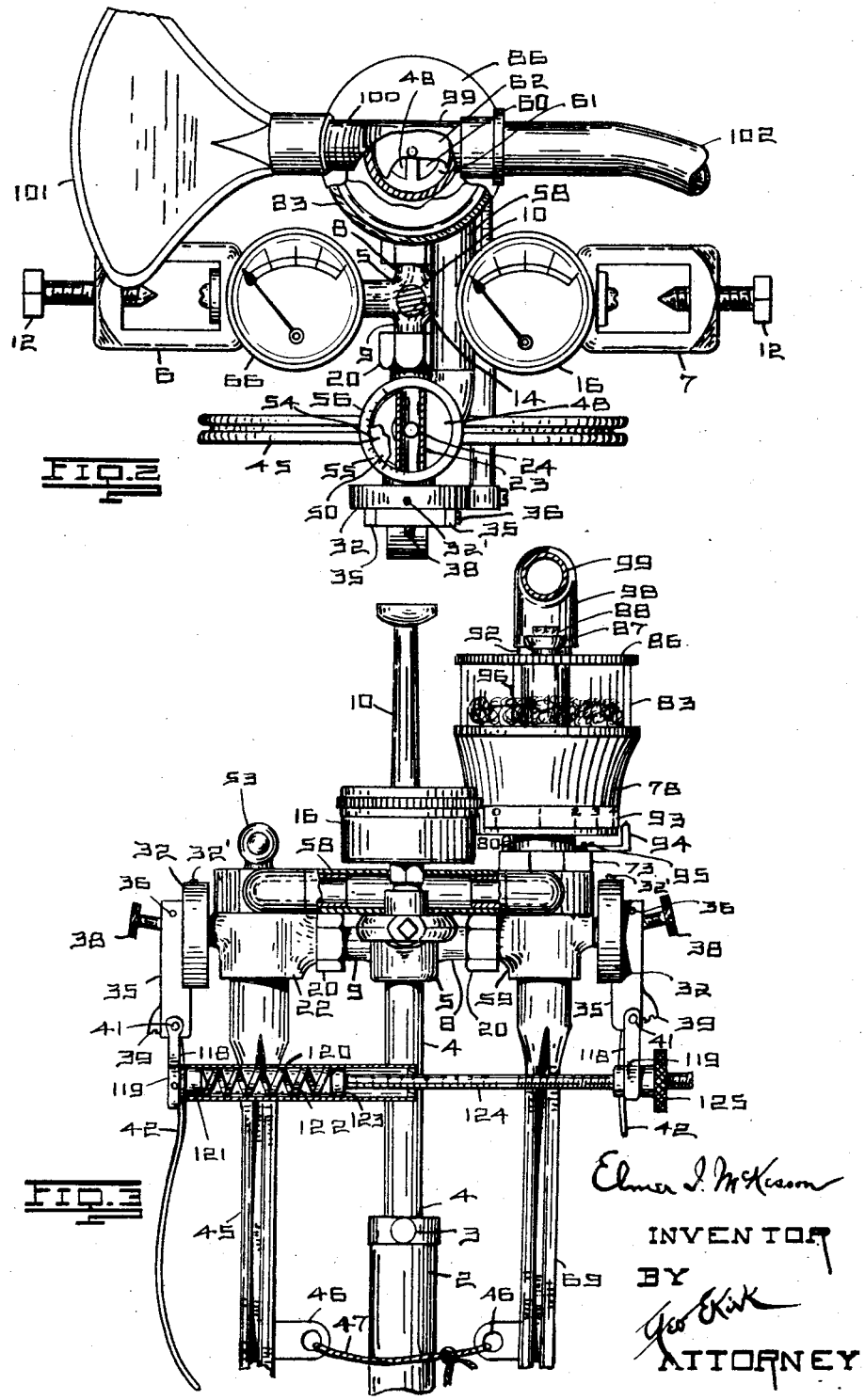

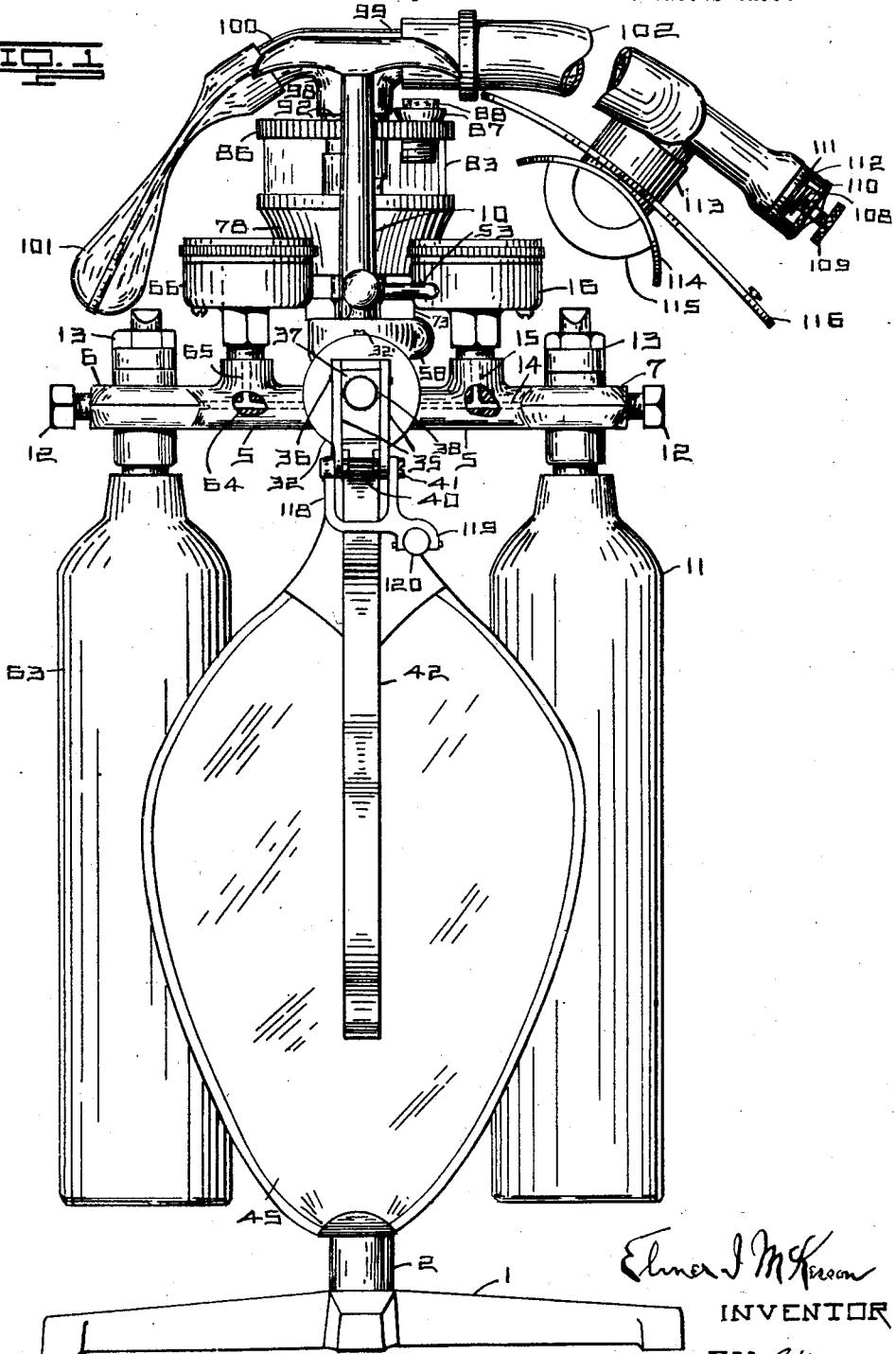

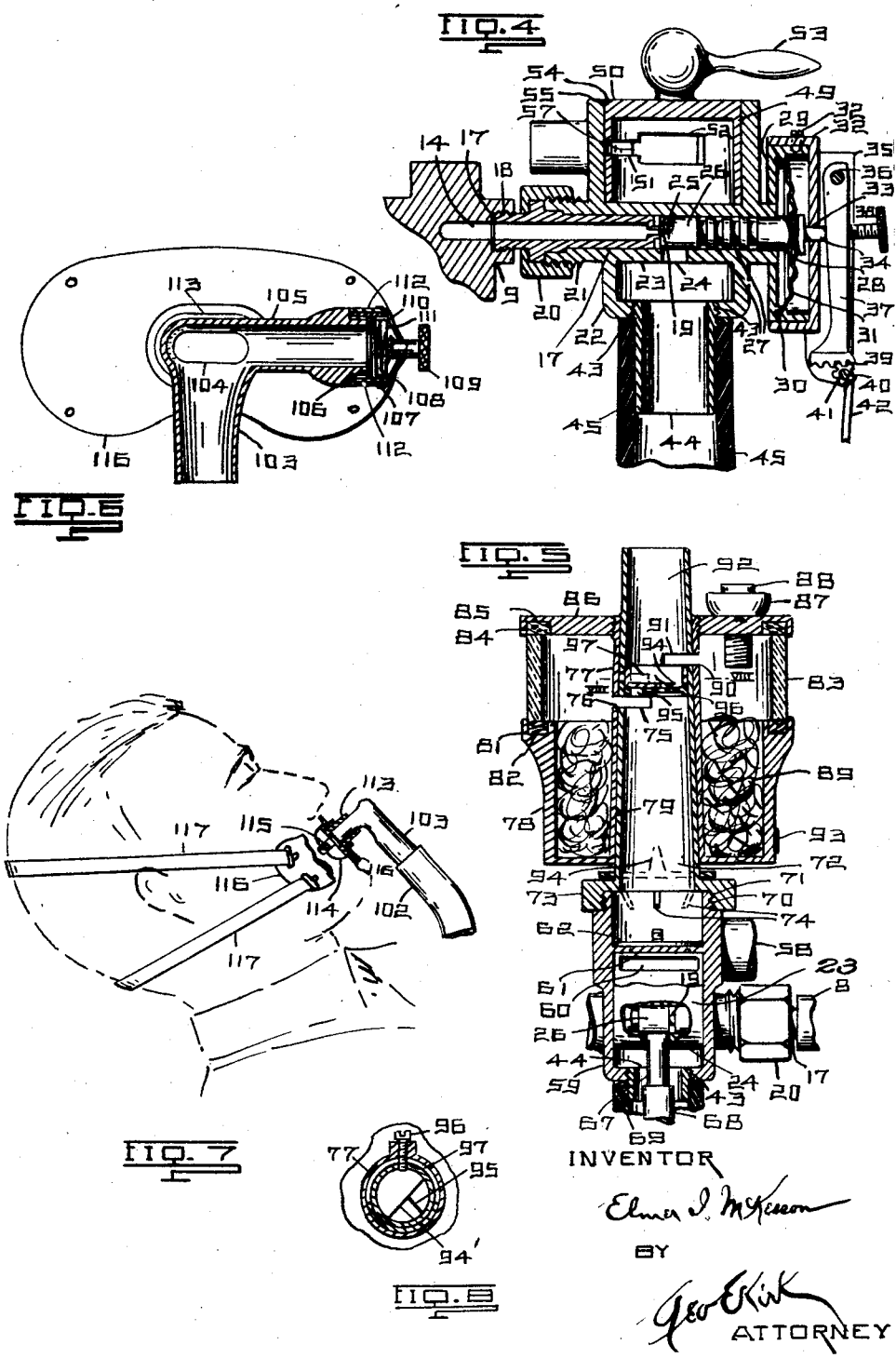

Patented Oct. 9, 1928.

1,687,255

UNITED STATES PATENT OFFICE.

ELMER I. McKESSON, OF TOLEDO, OHIO.

GAS-ADMINISTERING APPARATUS.

Application filed September 12, 1921. Serial No. 500,051.

This invention relates to the handling of gas or gases.

This invention has utility when incorporated in apparatus for administering gas for anæsthesia, analgesia, pain allaying cases and resuscitation.

Referring to the drawings:

Fig. 1 is a side elevation, with parts broken away, of an embodiment of the invention in a portable gas administering machine for nitrous oxid and oxygen anæsthesia;

Fig. 2 is a fragmentary plan view of the apparatus of Fig. 1;

Fig. 3 is a side elevation, with parts broken away, of the showing of the device in Fig. 2;

Fig. 4 is a section, on an enlarged scale, of the oxygen proportioning or control valve together with the automatic oxygen supply valve;

Fig. 5 is a section through the vaporizer or ether cup together with the nitrous oxid valve and the check valve associated therewith;

Fig. 6 is a view, in rear elevation, of the face nozzle or mask, showing the mounting therefor with the relief valve in section;

Fig. 7 is a view showing the mask, partly broken away, and in mounting position; and Fig. 8 is a section on the line VIII—VIII, Fig. 5.

A base 1 is provided having upstanding therefrom tube 2 as the lower member of a column. This column section 2 is provided with a set screw 3 permitting telescopic adjustment therein of second column member 4 (Figs. 1, 3). This column member 4 carries a cross member 5 having arm carrying yokes 6, 7 (Fig. 2), and at right angles thereto, valve carrying arms 8, 9. In alignment with the column 2, 4, and above this cross member 5 is handle 10 permitting ready shifting of the assembled device from place to place.

A supply tank 11 (Fig. 1), of the oxygen under pressure may be mounted by screw 12 in fixed relation in the yoke 7.

Upon opening valve 13 of the supply tank 11 of oxygen, the oxygen gas may flow from this tank 11 by way of duct 14 in the cross member 5. This duct 14 has a branch 15 extending upward to tank pressure indicating means or oxygen gauge 16. From the oxygen supply tank 11 the duct 14 from the yoke 7 passes into arm 9. Member 17 has a threaded portion 18 screwed into the internally threaded arm 9 in hot solder for bringing into proper spaced relation outwardly extending terminal port 19. The hot solder makes it possible to produce a tight joint and maintain the proper position for this port 19. In the assembly of this member 17 with the arm 9 an enlargement of the member 17 is in position to hold nut 20 loosely thereon so that this nut 20 may be in a union assembly with externally threaded tubular extension 21 from valve housing 22. This valve housing 22 comprises a cylindrical portion 23 having a port 24 adjacent the terminus of the port 19 of the member 17. A compressible seat 25, as of bakelite, is held in position with end of plunger 26 to abut the port 19. This plunger 26 has annular grooves 27 which in reciprocation of the plunger 26 in the guide 23 of the housing 22 may serve to retain dirt or fine dust so that such may not be detrimentally distributed for interfering with the operation of the device. This plunger 26 has rounded end 28 protruding from the guide 23 remote from the port 19. Mounted on the protruding end of this cylindrical guide 23 is flange 29 having annular groove 30 in which is soldered a rim or peripheral flange of a corrugated diaphragm 31 disposed to pack or close the guide 23 and to be contacted on one side by the rounded end 28 of the plunger 26. This diaphragm 31 is housed by a cap 32 held in position thereon by a set screw 32'. This cap 32 concentric with its mounting on the flange 29 has in its closed forward end an opening 33 as a guide for stem 34 directed to contact the diaphragm 31 in opposition to the rounded end 28 of the plunger 26.

This cap member 32 also carries a pair of flanges or opposing ears 35 mounting near the top thereof a fulcrum pin 36 for a lever 37 mounted to extend downwardly therefrom. This lever 37 has therethrough a set screw 38 which may adjust the position of the lever 37 as to stem 34. The lower free end of this lever 37 has a tooth segment portion 39 in mesh with pinion 40 on fulcrum pin 41. This pinion 40 is fast with depending lever 42.

The housing 22 has, below the cylindrical guide 23, an internally threaded portion 43 to be engaged by threaded extension or nipple 44 thereby to mount a bag 45. This oxygen bag 45 is shown as of gusseted form, distensible and of rubber. The continuation of the lever 42 downward from the fulcrum 41 is so bowed that it will allow the bag to assume the desired degree of fullness in the normal operation of the machine consistent with rounding out of the bag. In order that this bag 45 may not swing around or get snarled in handling the device of this disclosure, the bag 45 is provided with an ear 46 (Fig. 3), having an opening therein to be engaged by a cord 47, which cord 47 may be tied to the column 2, 4. As the bag 45 expands it rounds out into the curved form of the lever 42 and in tending to rock the lever 42 on fulcrum 41 causes the pinion 40 to mesh with the segment 39 to act upon the second lever 37. There is accordingly herein a compound lever structure for multiplying the action of the degree of change in size of the bag 45. Accordingly there is a super-sensitive condition in the maintenance of the constant size for the oxygen bag 45, transmitted through the compound lever mechanism to shift the plunger 26 and thereby control the inlet supply of oxygen from the tank 11, duct 14, and member 17 by way of the port 19. The diaphragm 31 packs this port controling plunger 26 against leakage of the high pressure supply of the gas and still permits a very sensitive control of the port 19, for the plunger 26 is free for very easy movement in the guide 23.

In this valve housing 22 adjacent to the guide 23 and upwardly extending therefrom is port 48 (Fig. 2). This housing 22 (Fig. 4), above the cylindrical guide 23 has a cylindrical seat 49 to which this port 48 leads. In this seat 49 is disposed cylindrical valve element 50 of a proportioning valve provided with a narrow port portion 51 and connected thereto a wider port portion 52. This valve 50 is shifted by means of handle 53 so that its indicator mark 54 may be shifted as to more fine readings in scale portion 55 as controlled by the narrower port portion 51 merging into less fine graduations of scale portion 56 as controlled by port portion 52. As an instance in practice with the element 50 slightly over one inch in diameter the port 51 may have an angular extent of say 72° and likewise the port 52 have an angular extent also of 72° making the total port opening extent 144° in opening port 57 as controlled by this valve element 50. Extending from this port 57 of the demountable automatic valve housing 22 for the oxygen bag 45 on the oxygen side of the apparatus of this disclosure there is shown a duct 58, herein a detachable and flexible hose, extending to a second valve housing 59 (Figs. 2, 3, 5), detachably mounted on the arm 8 oppositely extending from the arm 9 of the device. This valve housing 59 has in communication with duct 58 a port 60 extending into the housing 59 below a ledge 61 upon which rests a check valve disk 62 (Fig. 2).

In the yoke 6 opposite the yoke 7 is nitrous oxid tank 63 held in position by set screw 12 and having its valve 13 opened to permit flow of nitrous oxid gas from the tank 63 by way of duct 64 having branch 65 extending to nitrous oxid tank pressure gauge or indicator 66. This duct 64 leads to a member 17 and has communication by way of a port 19 to a cylindrical member 23 in the housing 59. A port 24 from this cylindrical member 23 in the housing 59 has tubular extension 67 to which is connected a flexible tube or hose 68 extending downward into nitrous oxid bag 69 connected by nipple 44 to the housing 59. There is an automatic valve which is carried by this housing 59 similar in general features of construction and operation to the automatic valve which is carried by the housing 22. This automatic valve 19, 26, 31, 34, 37, 42, in the housing 59 controls the flow of the gas for delivery by the hose 68 into the bag 69. This hose 68 extending downward into the bag 69 has a quieting effect thereby giving a different sound to the supply of the greater volume of nitrous oxid into the nitrous oxid bag 69 than is the sound given to the supply of oxygen into the oxygen bag 46. The nitrous oxid from the bag 69 may pass up under the check valve 62 by way of a port 48. Accordingly this single check valve 62 is an automatic valve controlling the flow of gas passing this check valve 62 not only of the nitrous oxid from the nitrous oxid bag 69 but also of the oxygen from the oxygen bag 46.

The valve housing 59 has at its upper portion an externally threaded extension 70 to be engaged by internally threaded portion 71 of delivery duct 72 from this housing 59 (Fig. 5). This delivery duct 72 has a hexagonal portion 73 forming a sort of nut exterior of the threaded portion 71 so that this delivery duct 72 may be turned up into engagement with the threaded portion 71. This brings prongs 74 into position in the housing 59 so that the lifting of the check valve 62 may not be to a height which may knock the valve around or get it clogged or otherwise in a position which may not permit it to reseat on the ledge 61 for normally and properly closing ports 48, 60 (Fig. 2).

This delivery duct 72 upwardly extending from the housing 59 has port 75 of somewhat less than 180° angular extent which may be brought into register with port 76 of upwardly extending tubular stem 77 of lower cup member 78 of a vaporizer. This lower vaporizer cup member 77, 78, has inward of the member 77 a concentric tubular bearing 79 engaging the exterior of the delivery duct 72. This cup is held against settling or adjusting into locking or binding relation with the tube or duct 72 by adjustable set screw 80 (Fig. 3) from the nut portion 73 of the member 72.

The lower cup 78 of the vaporizer or ether cup has an annular seat 81 to receive a gasket 82 of flexible material, herein cork being used. Upon this cork gasket 82 is placed a cylindrical transparent portion 83. This portion 83 is in this instance glass. Opposing the packing 82 this glass clyinder 83 seats against a second cork gasket 84 in seat 85 of ether cup top 86 which has threaded engagement with the protruding upper end of the central stem 77 of the ether cup base 77, 78. A filling funnel 87 is provided in the top 86 and this may be closed by a stopper 88 as of cork.

Accordingly in the operation of this ether cup there may be placed in the base 77, 78, a fibrous material 89, as loosely woven fabric to provide additional evaporating surface for the ether. As the ether is poured into the funnel 87 and the stopper 88 closed, the capillary attraction of the ether in saturating the fabric 89 gives a large exposed area for surface evaporation. The gases entering this vaporizer by way of the port 75, 76, may take up a volume of this ether from this ether cup 77, 78, 83, and in passing therefrom by way of port 90 in the stem 77 and through port 91 of the concentric portion 92 pass through the portion 92 as the special delivery duct section.

Direct flow of gas from the section 72 to the section 73 of the delivery duct is not permitted when the ports 75, 76, and 90, 91, are fully open. However, when the ports are partially open ports 94, 95, allow some gas to by-pass through the cup but when the ports 75, 76, 90, 91, are fully closed, these ports 94, 95, come into full register so that there is a definite full by-passing of this vaporizer or ether cup. Graduations 93 carried by the periphery of base 77, 78, of the ether cup disclose the amount of the opening of the ports as indicated by fixed pointer 94 as anchored by set screw 95 to the member 72 above the hexagonal portion 73. A set screw 96 (Fig. 8) through the central tubular stem 77 of the ether cup base passes through slot 97 in the duct 72 to hold the member providing the port 94' to rotate with the cup in the simultaneous control of the by-pass with the shifting of the vaporizer.

Mounted on the delivery duct section 92 is a member having a supply stem portion 98 and a delivery stem portion 99 (Fig. 1). In line with this delivery stem portion 99 but slightly bent is a tubular section 100 upon which is mounted rebreathing bag 101 of a capacity less than the tidal respiration capacity of the patient being treated.

The delivery section 99 of this member 98, 99, 100, is connected to flexible tube or duct 102 of the general delivery tube which extends to a second member having tubular connection 103 with the tube 102. This three armed or second T-member has besides the supply tubular portion 103, (Figs. 1, 6, 7), a delivery tubular portion 104 and, at an angle thereto, a relief valve carrying tubular portion 105. This relief valve carrying portion 105 is provided with a seat 106 for a disk 107 normally held thereagainst by a spring 108, the holding action of which spring may be adjusted by set screw 109 as held by cap 110. This cap 110 (Figs. 1, 6) has a cylindrical portion provided with an annular series of ports 111. A relatively shiftable shield 112 about these ports 111 serves to direct the surplus of exhalation away from the operator as well as away from the patient in such direction as may be desired.

Upon this portion 104 of this T-member 103, 104, 105, is mounted a mask proper herein shown as rubber tubular section 113 having integral therewith a lip shield 114, a tongue holding device 115 to preclude the patient from sticking the tongue into the tubular portion 104 thereby clogging the supply or outflow of gas. In addition to this lip shield 114 there is a relatively independently adjustable sheet or face shield 116 which may be drawn up against the cheeks of the patient by using extensible straps 117 about the head of the patient. Accordingly there is here provided a mouth mask which will permit snug fitting of the mask against the face of the patient thereby minimizing any chance for waste or escape of gas, and likewise so holding the mouth of the patient open that there must be a supply and discharge of gas and that the mask orifice may not be clogged by the patient's tongue.

The apparatus may be knocked down into a very compact form for portability by removing the sections of the column 2, 4, and by loosening the nuts 20, turning or shifting the housings 22, 59, into desired compact position. The vaporizer may be readily removed and likewise the delivery duct tube 102 may be flexed or disconnected in such relation as desired. Upon setting up the device, the parts are brought into position as shown in Fig. 1. With the tank valves 13 opened after the oxygen tank 11 and the nitrous oxid tank 63 have been assembled, the respective gauges 16, 66, will show at once the tank pressure.

With the apparatus of this disclosure, the single valve steps down the high pressure of the tank for direct delivery to the patient, at practically atmospheric pressure and this supply is automatically maintained and the volume taken is controlled directly by the patient. The proportioning or varying of of the volume of oxygen as to the volume of nitrous oxid is effected by the single manipulation of the oxgen valve, thereby modifying the total volume from but one valve source. This does not affect the aggregate flow for such aggregate flow is determined by the breathing of the patient and the action of the automatic check valve 61, 62, (Figs. 3, 5). Accordingly as this oxygen valve 50, 53, (Fig. 4) is open the proportion of the oxygen passing from the oxygen bag 46 to the delivery duct 72 by the check valve 61, 62, from the port 60 above the nitrous oxid bag 69 is increased, but the total volume passing the disk 62 is not necessarily increased. Such volume passing this weighted disk 62 is definitely controlled by the breathing of the patient. The weight of the disk 62 is proportioned to the inhalation draft of the patient and is sufficient to hold the valve seated in desired normal operation of exhalation against the low pressure in the bags 46, 69, acting upon the check valve 62 through the ports 48, 60.

The vaporizer action may be eliminated by adjusting the ports 94, 95, to register, or by demounting the vaporizer entirely and connecting the T-member portion 99 directly upon the portion 70.

In such operations as it may be desired to use ether or a vaporizer, the cup may be inserted in the connection as shown and the proportioning of the vapor to be incorporated with the other gases may be readily controlled by rotating this cup on its mounting stem.

The freedom of operation of the relief valve 106, 107, may be adjusted by the set screw 109 for practically total exhalation release or a desired distention of the rebreathing bag 101. This rebreathing bag 101, being of less capacity than the total volume of the patient, will take up but a portion of the exhalation, thereby retaining a certain amount of the richer gases returned as in the delivery tube 102 and the large mouth and lung passages, as well as a little of the carbon-dioxid exhalation for exciting and maintaining the breathing operations of the patient.

While the relative size of the similar bags 46, 69, may determine approximately the equalization of the pressures therebetween, there may be additional means provided which can permit of convenient setting up of the pressure in these bags. To this end there is mounted upon each fulcrum pin 40, a major yoke member 118 having a minor yoke extension 119 (Figs. 1, 3). One of these minor yoke extensions 119, pivotally carries a tube or stem 120 having an anchor 121 therein for tension spring 122, having an anchor connection 123 with relatively telescopic stem 124 as to the tubular portion 120. The opposite yoke 118, 119, carries adjusting nut 125 so that graduations on the stem 124 as to the tube 120 may disclose, in millimeters, the pressure of the gas in the bags, as the nut 125 travels along the stem 124 to pull the stem out of the tube 120 in placing the gas in the bags 45, 69, under pressure as indicated by the scale on the stem 124.

The compound lever automatic valve in its operation directly from high tank pressure down to practically atmospheric pressure in supply to a patient, is a simple single step mechanism. The gas supply to the bag is always in direct response for replenishing the volume inhaled. In using the oxygen for resuscitation this bag will respond automatically to the labored breathing of the patient. The rebreathing bag 101, and adjustable spill valve 106, 107, insure economical handling of the gas and supply only as demanded by the patient.

What is claimed and it is desired to secure by Letters Patent is:

1. A gas administering machine embodying a main support unit comprising yoke and valve mounting means, said unit embodying chambers therein, valves on opposite sides of said unit for controlling supplies to said chambers, and a connecting duct exterior of said unit and extending between the chambers.

2. A gas administering machine embodying a main support unit comprising a pair of yokes, a pair of valve mounting means, ducts from the yokes to the valve mounting means, an automatic valve for each mounting means, a chamber for each valve, and an additional duct exterior of said support unit and directly from a valve chamber at one mounting means to the valve chamber at the other mounting means for gas direct flow in one direction from one of said chambers to the other.

3. A gas administering machine embodying a main support unit comprising a pair of yokes, a pair of valve mounting means, ducts from the yokes to the valve mounting means, an automatic valve for each mounting means, and independently of the main support a duct exterior of said support unit and directly between the valves for one direction gas flow from one valve to the other.

4. A gas administering machine embodying a delivery duct, a nitrous oxid bag, an oxygen bag, a valve for each bag, a housing for said valves, a duct exterior of said housing and from the oxygen bag directly to the nitrous oxid valve, and a check valve for the gas from the bags, said check valve being adjacent the nitrous oxid valve and remote from the oxygen valve.

5. A gas administering machine embodying a main support, a pair of valves carried by the support, a housing for each valve, bags connected to the valve housings, valve controlling means between the bags and valves, and means carried by and extending between the valve housings and adjustable to modify the controlling means for simultaneously varying the control for both bags whereby there is pneumatic bag response for more closely approximating pressure equilibrium therebetween.

6. A gas administering machine embodying a main support, a pair of valves carried by the support, a housing for each valve, bags connected to the valve housings, valve controlling means between the bags and valves, and means carried by and extending between the valve housings and adjustable to modify the controlling means for simultaneously varying the control for both bags including relatively movable members provided with graduations co-acting therebetween.

7. In a gas administering machine embodying a delivery duct, a support and a rebreathing bag, the combination of a T-connection having its upright stem portion mounted on the support and connected with the delivery duct as to one arm of the T-cross portion, said rebreathing bag being mounted on the opposite arm of the T-cross portion from said delivery duct.

8. A gas administering machine embodying a pair of bags, a pressure supply for each bag, a valve between each supply and its bag, bag engaging means for operating the valves, and an adjustable extensible bar embodying telescopic sections between the engaging means for varying the pressure action of said means simultaneously on each of said bags.

In witness whereof I affix my signature.

ELMER I. McKESSON.